(12) United States Patent
Bendall et al.

(10) Patent No.: US 7,821,649 B2
(45) Date of Patent: *Oct. 26, 2010

(54) FRINGE PROJECTION SYSTEM AND METHOD FOR A PROBE SUITABLE FOR PHASE-SHIFT ANALYSIS

(75) Inventors: Clark Alexander Bendall, Syracuse, NY (US); Guiju Song, Shanghai (CN); Li Tao, Shanghai (CN); Kevin George Harding, Niskayuna, NY (US); Thomas Karpen, Skaneateles, NY (US)

(73) Assignee: GE Inspection Technologies, LP, Lewiston, PA (US)

( * ) Notice: Subject to any disclaimer, the term of this patent is extended or adjusted under 35 U.S.C. 154(b) by 321 days.

This patent is subject to a terminal disclaimer.

(21) Appl. No.: 12/042,821

(22) Filed: Mar. 5, 2008

(65) Prior Publication Data
US 2009/0225321 A1    Sep. 10, 2009

(51) Int. Cl.
*G01B 11/24* (2006.01)
*G01B 11/14* (2006.01)
*G01N 21/55* (2006.01)

(52) U.S. Cl. .................. 356/606; 356/622; 356/447

(58) Field of Classification Search ......... 356/600–626, 356/512, 445, 447; 250/237 G
See application file for complete search history.

(56) References Cited

U.S. PATENT DOCUMENTS

| | | | |
|---|---|---|---|
| 4,988,886 A * | 1/1991 | Palum et al. ............ 250/559.07 |
| 5,066,119 A * | 11/1991 | Bertrand ...................... 356/124 |
| 5,069,548 A | 12/1991 | Boehnlein |
| 5,135,308 A | 8/1992 | Kuchel |
| 5,307,152 A * | 4/1994 | Boehnlein et al. ........... 356/605 |
| 5,386,292 A | 1/1995 | Massen |
| 5,434,669 A | 7/1995 | Tabata |
| 5,835,218 A | 11/1998 | Harding |
| 5,847,832 A | 12/1998 | Liskow |

(Continued)

FOREIGN PATENT DOCUMENTS

JP        59192223 A        10/1984

(Continued)

OTHER PUBLICATIONS

EP Search Report Issued in connection with corresponding EP Patent Application No. 09165205.7 filed on Jul. 10, 2009.

(Continued)

*Primary Examiner*—Sang Nguyen
(74) *Attorney, Agent, or Firm*—Global Patent Operation; Mark A. Conklin (57) ABSTRACT

A probe includes an insertion tube and a plurality of light emitters disposed on the distal end of the insertion tube. The probe further includes at least one intensity modulating element through which light from the plurality of light emitters is passed to project a plurality of fringe sets onto a surface. Each of the plurality of fringe sets intern have a structured-light pattern that is projected when one emitter group of at least one of the plurality of light emitters is emitting. The probe further includes an imager for obtaining at least one image of the surface and a processing unit that is configured to perform phase-shift analysis on the at least one image. A method for projecting a plurality of fringe sets suitable for phase-shift analysis on a surface using a probe is also presented.

19 Claims, 6 Drawing Sheets

U.S. PATENT DOCUMENTS

| | | | |
|---|---|---|---|
| 6,084,712 A * | 7/2000 | Harding | 359/618 |
| 6,088,105 A | 7/2000 | Link | |
| 6,100,984 A | 8/2000 | Chen | |
| 6,291,817 B1 * | 9/2001 | Kobayashi et al. | 250/237 G |
| 6,438,272 B1 * | 8/2002 | Huang et al. | 382/286 |
| 6,950,191 B2 * | 9/2005 | Ge | 356/450 |
| 6,977,732 B2 * | 12/2005 | Chen et al. | 356/603 |
| 7,170,677 B1 | 1/2007 | Bendall et al. | |
| 7,286,246 B2 * | 10/2007 | Yoshida | 356/605 |
| 7,433,058 B2 * | 10/2008 | Cantin et al. | 356/605 |
| 2002/0163573 A1 * | 11/2002 | Bieman et al. | 348/46 |
| 2003/0043387 A1 | 3/2003 | Lim | |
| 2005/0046872 A1 | 3/2005 | Hu et al. | |
| 2005/0099638 A1 | 5/2005 | Quadling | |
| 2006/0132790 A1 | 6/2006 | Gutin | |
| 2006/0282009 A1 | 12/2006 | Oberg | |
| 2007/0109558 A1 | 5/2007 | Harding et al. | |
| 2009/0225329 A1 * | 9/2009 | Bendall et al. | 356/610 |

OTHER PUBLICATIONS

Bieman et al., "Absolute Measurement using Field Shift Moire," SPIE Proceedings vol. 1614, Optics, Illumination and Image Sensing for Machine Vision VI, Boston, Massachusetts, Nov. 1991.

Boehnlein et al,, "Field Shift Moire, a New Technique for Absolute Range Measurement," SPIE Conference 1163, Fringe Analysis Methods, San Diego, California, Aug. 1989.

Harding, "Latest Optical Methods for Industrial Dimensional Metrology," Proceedings SPIE vol. 6000, 600001, Two- and Three-Dimensional Methods for Inspection and Metrology III, 2005.

Harding et al., "Machine Vision Method for Small Feature Measurements." Tang Publication: Proc. SPIE vol. 5606, p. 153-160, Two- and Three-Dimensional Vision Systems for Inspection, Control, and Metrology II; 2004.

* cited by examiner

▨ Emitter group 1
☰ Emitter group 2
☐ Emitter group 3

FRINGE PROJECTION SYSTEM AND METHOD FOR A PROBE SUITABLE FOR PHASE-SHIFT ANALYSIS

BACKGROUND OF THE INVENTION

1. Field of the Invention

The subject matter described herein relates generally to borescopes and endoscopes, and more particularly, to a borescope/endoscope which provides 3D surface mapping and dimensional measurement.

2. Related Art

Borescopes and endoscopes are typically used for inspection inside a remote cavity. Most borescopes/endoscopes, referred to herein as probes, employ an external light source coupled to fiber optic bundles in the probe to provide illumination of a remote object or surface at the distal end. When the object is illuminated, an internal image is formed by a lens system on an image sensor, and the image is relayed to a connected display, such as a video screen. The image sensor may be located at the proximal end of the probe, as with an optical rigid borescope or fiberscope, or at the distal end as with a video borescope or endoscope. Such systems are often used to inspect in inaccessible locations for damage or wear or to verify that parts have been properly manufactured or assembled. Among other things, it is desirable to obtain dimensional measurements to verify that damage or wear does not exceed an operational limit or that a manufactured part or assembly meets its specifications. It may also be desirable to produce a 3D model or surface map for comparison to a reference, 3D viewing, reverse engineering, or detailed surface analysis.

The image shown on the connected display varies in magnification and apparent size depending upon the distance between the object and the distal end of the probe. This leads to difficulties in directly determining dimensional measurements, especially in three spatial dimensions.

There are a number of known approaches for providing 3D data through a probe including splitting the view to gain a stereo image (stereo viewing), projecting a coarse pattern of dots onto the remote object, or using a single line to obtain a single image profile. Stereo methods can be used to create a 3D view, but can only provide information where two points on the image can be correlated. This can be problematic when little surface detail exists. The correlation process can also require significant processing, so producing a full 3D surface map can be time consuming. It is more typical to only correlate a small number of points needed for basic measurements. Projecting a course pattern of dots permits measurement to be obtained at the points of the dots. However, the areas between the dots are left to be interpolated, so any surface variations between them are lost. Finally, a single line profile provides useful information along that single profile, but proper positioning of the single line on the object of interest can be difficult, and measurements that require non co-linear points, such as point to line or area measurements, are subject to error if the surface is not flat or the view is not perpendicular to the surface. The scanning of a single profile line that is often employed in commercial systems to build a 3D surface map is generally not practical in a small probe due to size constraints.

Other limitations also exist regarding the approaches discussed above. For example, a large computing capacity is often required to implement the solutions, and highly skilled technicians are needed to operate the equipment. In addition, the above approaches may not be appropriate when a dense 3D full surface map or full-field object measurement is desired. Without the full-field data, imperfections on a surface or object may be missed entirely. Thus, it is desirable to provide a probe that offers full-field surface mapping.

Full-field object data can be obtained through phase-shifting. Phase-shifting is an analysis technique used for non-contact optical metrology applications. Phase-shifting typically involves projecting one or more sets of parallel lines that cross the field of view (FOV) of a camera. As the object distance changes, the parallel lines, or fringe sets, shift across the FOV. Which line is which, or absolute phase, must be determined in order to make accurate measurements and obtain an accurate surface map. The absolute phase at a given point in the image is defined as the total phase difference ($2\pi$ times the number of line periods) between a reference point in the projected line pattern and the given point. The reference point can be arbitrarily defined.

There are a number of known approaches to decipher which line is which and determine absolute phase. Some approaches include employing multiple fringe sets with physical horizontal offsets resulting in a relative phase that changes with distance or using multiple fringe sets with physical axial offsets to change the period with distance. Most techniques use additional projections. For example, to assist in determining the absolute phase an extra line may be projected to give a starting reference point. The determined absolute phase combined with the fringe set position in the FOV are commonly used to determine absolute object distance.

Phase-shifting methods have not been practical for use in devices such as borescopes and endoscopes. The equipment required to project suitable line patterns for phase-shifting methods usually include a projector, scanner, piezo mirror, or similar item. Among other things, the size limitations of probes make the use of typical equipment mechanically challenging.

Thus, it is desirable to provide a practical mechanical configuration of a probe that is able to perform measurements and 3D surface mapping based on phase-shift analysis.

BRIEF DESCRIPTION OF THE INVENTION

In accordance with an embodiment of the present invention, a probe comprises an insertion tube and a plurality of light emitters disposed on the distal end of the insertion tube. The probe further comprises at least one intensity modulating element through which light from the plurality of light emitters is passed to project a plurality of fringe sets onto a surface. Each of the plurality of fringe sets intern comprise a structured-light pattern that is projected when one emitter group of at least one of the plurality of light emitters is emitting. The probe further comprises an imager for obtaining at least one image of the surface and a processing unit that is configured to perform phase-shift analysis on the at least one image.

In another embodiment of the invention, a method for projecting a plurality of fringe sets suitable for phase-shift analysis on a surface using a probe is provided. The probe comprises viewing optics on the distal end of an insertion tube and light emitters on each side of the viewing optics. The plurality of light emitters positioned on one side of the viewing optics comprises a first emitter module and the plurality of light emitters positioned on the other side of the viewing optics comprises a second emitter module. The first emitter module intern comprises a plurality of emitter groups comprising at least one of the plurality of light emitters of the first emitter module. Similarly, the second emitter module intern comprises a plurality of emitter groups comprising at least one of the plurality of light emitters of the second emitter module. The probe further comprises an intensity-modulating area positioned on each side of the viewing optics. A first intensity modulating area is positioned on one side of the viewing optics and a second intensity modulating area is positioned on the other side of the viewing optics. The method comprises passing light from the first emitter module through the first intensity modulating area to form a first projection set and passing light from the second emitter module through the second intensity modulating area to form a second projection set. The first projection set and second projection set each comprise a plurality of fringe sets. Each of the plurality of fringe sets comprise a structured-light pattern projected onto the surface when one emitter group of at least one of the plurality of light emitters is emitting. The plurality of light emitters are positioned such that the structured-light pattern of one fringe set of the first projection set projected from one emitter group of the first emitter module exhibits a phase-shift relative to the structured-light patterns of the other fringe sets of the first projection set projected from the other emitter groups of the first emitter module. Similarly, the structured-light pattern of one fringe set of the second projection set projected from one emitter group of the second emitter module exhibits a phase-shift relative to the structured-light patterns of the other fringes sets of the second projection set projected from the other emitter groups of the second emitter module.

BRIEF DESCRIPTION OF THE DRAWINGS

The following detailed description is made with reference to the accompanying drawings, in which.

DETAILED DESCRIPTION OF THE PREFERRED EMBODIMENT

Figure 1:
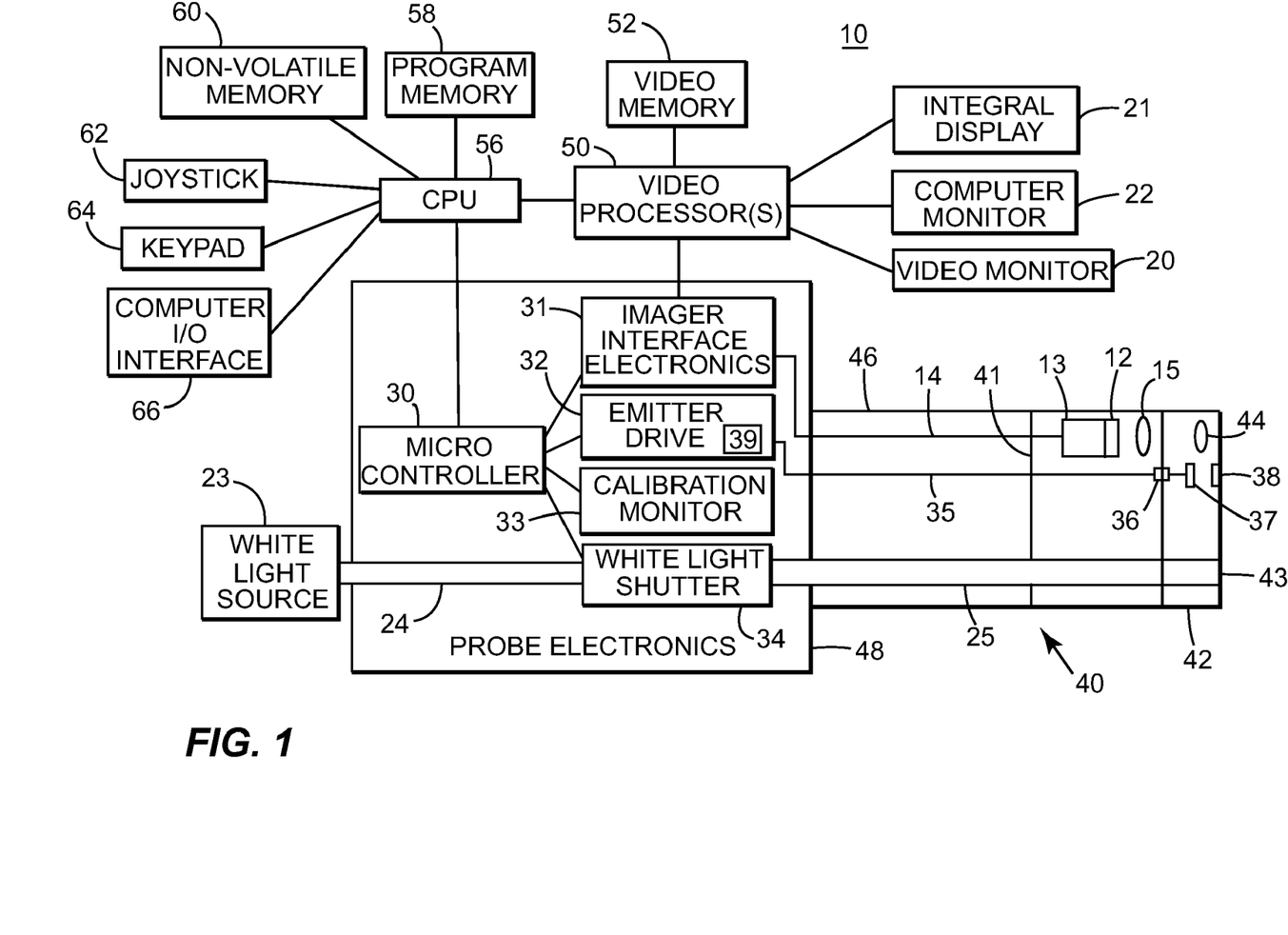
FIG. 1 is a schematic diagram of a probe (borescope/endoscope) system in accordance with one embodiment of the present invention.

Illustrated in FIG. 1, a borescope/endoscope system or probe 10 according to an embodiment of the invention is shown. An insertion tube 40 comprises elongated portion 46 and detachable distal tip 42. Elongated portion 46 comprises a main long, flexible portion, a bending neck, and a camera head. Delineation line 41 shows where the camera head starts on elongated portion 46. The camera head of elongated portion 46 typically includes at least imager 12, electronics 13, and probe optics 15. Detachable distal tip 42 typically attaches to the camera head of elongated portion 46, mentioned above. Detachable distal tip 42 contains viewing optics 44 which are used in combination with probe optics 15 to guide and focus light received from the surface or object (not shown) onto imager 12. The viewing optics 44 may optionally include relay optics such as a lens or fiber optic system to remote the camera head away from the distal tip.

Imager 12 may comprise, for example, a two-dimensional array of light-sensitive pixels that outputs a video signal in response to the light level sensed at each pixel. Imager 12 may comprise a charge-coupled device (CCD), complementary metal-oxide-semiconductor (CMOS) image sensor, or other devices of similar function. The video signal is buffered by electronics 13 and transferred to imager interface electronics 31 via signal line 14. Imager interface electronics 31 may include, for example, power supplies, a timing generator for generating imager clock signals, an analog front end for digitizing the imager video output signal, and a digital signal processor for processing the digitized imager video data into a more useful format for video processor 50.

Video processor 50 performs various functions not limited to image capture, image enhancement, graphical overly merging, and video format conversion and stores information relating to those functions in video memory 52. Video processor 50 may comprise field-programmable gate array (FPGA), digital signal processor (DSP), or other processing elements and provides information to and receives information from central processing unit (CPU) 56. The provided and received information may relate to commands, status information, video, still images, and/or graphical overlays. Video processor 50 also outputs signals to various monitors such as computer monitor 22, video monitor 20, and integral display 21.

When connected, each of computer monitor 22, video monitor 20, and/or integral display 21 typically display images of the object or surface under inspection, menus, cursors, and measurement results. Computer monitor 22 is typically an external computer type monitor. Similarly, video monitor 20 typically includes an external video monitor. Integral display 21 is integrated and built into system 10 and typically comprises a liquid crystal display (LCD).

CPU 56 preferably uses both program memory 58 and non-volatile memory 60, which may include removable storage devices. CPU 56 may also use volatile memory such as RAM for program execution and temporary storage. A keypad 64 and joystick 62 convey user input to CPU 56 for such functions as menu selection, cursor movement, slider adjustment, and articulation control. Computer I/O interface 66 provides various computer interfaces to CPU 56 such as USB, Firewire, Ethernet, audio I/O, and wireless transceivers. Additional user I/O devices such as a keyboard or mouse may be connected to computer I/O interface 66 to provide user control. CPU 56 generates graphical overlay data for display, provides recall functions and system control, is configured to perform phase-shift analysis and measurement processing, and provides image, video, and audio storage.

System 10 further comprises contacts 36 that electrically couple elongated portion 46 to detachable tip 42 through the camera head. Contacts 36 may be spring loaded and also provide electrical power from drive conductor 35 to emitter module 37, which comprises a plurality of light emitters. Drive conductor 35 carries power from emitter drive 32 to the plurality of light emitters disposed on the distal end of insertion tube 40. Drive conductor 35 comprises one or more wires and may be incorporated with signal line 14 in a common outer jacket (not shown). Drive conductor 35 may also share conductors with signal line 14 and/or utilize the insertion tube 40 structure for carrying current. Emitter drive 32 includes, for example, an adjustable current source with a variable on time to compensate for light emitters with differing power capabilities and efficiencies. Emitter drive 32 also comprises brightness or fringe contrast determining function 39. Alternatively, video processor 50, discussed above, may include fringe contrast determining function 39.

The at least one emitter module 37 on detachable tip 42 comprises a plurality of light emitters and optionally other electronics for control/sequencing of emitters, sensing temperature, and storage/retrieval of calibration data. The at least one emitter module 37 may include a heat sink made of a ceramic or metal, for example, to reduce the temperature rise of the plurality of light emitters. Light from the plurality of light emitters disposed on detachable tip 42 is passed through at least one intensity modulating element 38 to alter the distribution of light and project at least one structured-light pattern on the surface suitable for phase-shift analysis. A fringe set comprises a structured-light pattern projected when one emitter group of at least one of the plurality of light emitters is emitting light. Light from the plurality of light emitters is passed through the at least one intensity modulating element 38 to project a plurality of fringe sets onto the surface.

The probe operates in measurement mode when the at least one of the plurality of fringe sets is projected onto the surface. During measurement mode, emitter module 37 is enabled and at least one digital image comprising a structured-light pattern on the surface is captured. Phase-shift analysis is may be performed directly on the at least one captured digital image. It may also be performed on data derived from the at least one captured digital image. For example, a luminance component derived from a YCrCb, RGB, or any other captured image format could be used. Thus, any reference to performing phase-shift analysis on an image made herein would include performing phase-shift analysis on the actual referenced image or on any data derived from the referenced image.

The probe operates in inspection mode when the at least one structured-light pattern is absent. During inspection mode, inspection light source 23 is enabled and outputs light from the distal end of insertion tube 40. The elements that produce and deliver light during inspection mode may collectively be referred to as an inspection light delivery system. In one embodiment, the inspection light delivery system comprises inspection light source 23, source fiber bundle 24, shutter mechanism 34, probe fiber bundle 25, and light passing element 43. In other embodiments, the inspection light delivery system may comprise very different elements such as, in the case of distally-located white LEDs, an LED drive circuit that can be disabled or provides an adjustable output current, wires for delivering power to the LEDs, the LEDs themselves, and a protective element to protect the LEDs. During measurement mode, the intensity of light output from the inspection light delivery system is automatically decreased to avoid reducing the contrast of the at least one structured-light pattern, for example.

Inspection light source 23 is typically a white light source, but may comprise any appropriate light source for a probe such as a mercury or metal halide arc lamp, halogen lamp, laser/phosphor system, or LED based light source which could be either proximally or distally located. When a fiber based light source is used, source fiber bundle 24 is included in system 10. Source fiber bundle 24 comprises a non-coherent or semi-coherent fiber optic bundle and transmits light to shutter mechanism 34. Shutter mechanism 34 allows light output from the inspection light delivery system during inspection mode or regular inspection and blocks or otherwise inhibits light output from the inspection light delivery system during measurement mode or measurement pattern projection. Shutter mechanism 34 includes, for example, a solenoid or motor driven mechanical shutter or an electric light source disabler. The location of shutter 34 can vary based on its implementation. When shutter mechanism 34 allows light to pass, probe fiber bundle 25 delivers light to the surface or inspection site via light passing element 43. Probe fiber bundle 25 comprises a non-coherent fiber optic bundle. Light passing element 43 comprises a glass cane, formed fibers, and/or distribution control features such as lenses or a diffuser.

The previously discussed imager interface electronics 31, emitter drive 32, and shutter mechanism 34 are included in the probe electronics 48. Probe electronics 48 may be physically separated from a main control unit or CPU 56 to provide more local control over probe-related operations. Probe electronics 48 further comprise calibration memory 33. Calibration memory 33 stores information relating to the optical system of detachable tip 42 and/or elongated portion 46 such as magnification data, optical distortion data, and pattern projection geometry data.

Microcontroller 30, also included in probe electronics 48, communicates with imager interface electronics 31 to determine and set gain and exposure settings, controls emitter drive 32 circuitry, stores and reads calibration data from the calibration memory 33, controls shutter 34, and communicates with CPU 56.

Referring back to detachable tip 42, the elements shown in tip 42 could alternatively be located on elongated portion 46. These elements include viewing optics 44, at least one emitter module 37, at least one intensity modulating element 38, and light passing element 43, discussed above. In addition, the at least one light emitter module 37 comprising a plurality of light emitters could be fixedly attached to insertion tube 40 while the at least one intensity-modulating element is disposed on detachable tip 42. In this case, precise and repeatable alignment between detachable tip 42 and elongated portion 46 is required, but it is advantageous because allows different fields of view while eliminating the need for contacts between elongated portion 46 and detachable tip 42.

Mentioned above, a structured-light pattern is created on the surface by passing light through at least one intensity-modulating element 38, which alters the distribution of light. The structured-light pattern preferably comprises parallel light and dark lines comprising sinusoidal intensity profiles. Line patterns having square, trapezoidal, triangular, or other profiles may be projected on the surface as well when used with appropriate phase-shift analysis to determine phase of the pattern. The pattern may also comprise other than straight, parallel lines. For example, curved lines, wavy lines, zigzagging lines, or other such patterns may be used with appropriate analysis.

Figure 3:
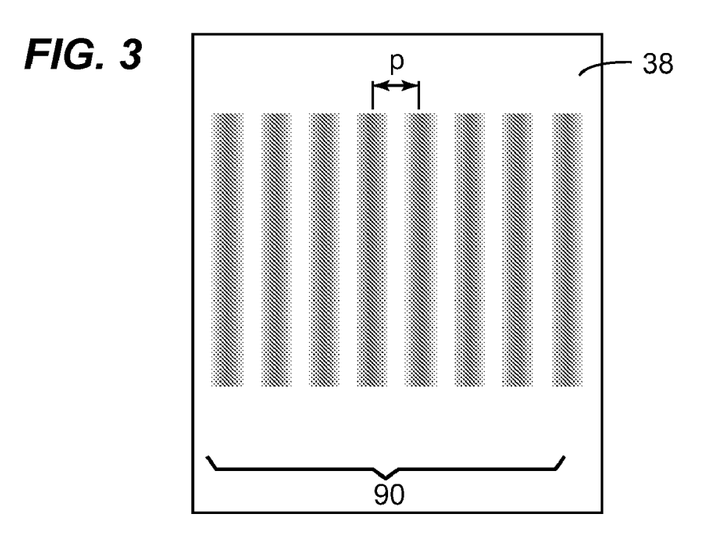
FIG. 3 is a top view of an intensity modulating element including a line grating with a period p.

In an embodiment of the present invention, the at least one intensity modulating element 38 comprises line grating 90, shown in FIG. 3. In addition, the at least one light emitter module comprises a plurality of light emitters. Particularly, the at least one light emitter module comprises LEDs or an LED array.

A fringe set comprises a structured-light pattern projected when one emitter group of at least one of the plurality of light emitters is emitting light. The plurality of light emitters of emitter module 37 are positioned such that the structured-light pattern projected when one group of at least one light emitter is emitting exhibits a spatial or phase-shift relative to the structured-light patterns projected when other groups of at least one light emitter are emitting. In other words, the structured-light pattern of one fringe set exhibits a spatial or phase-shift relative to the structured-light patterns of other fringe sets.

Figure 2:
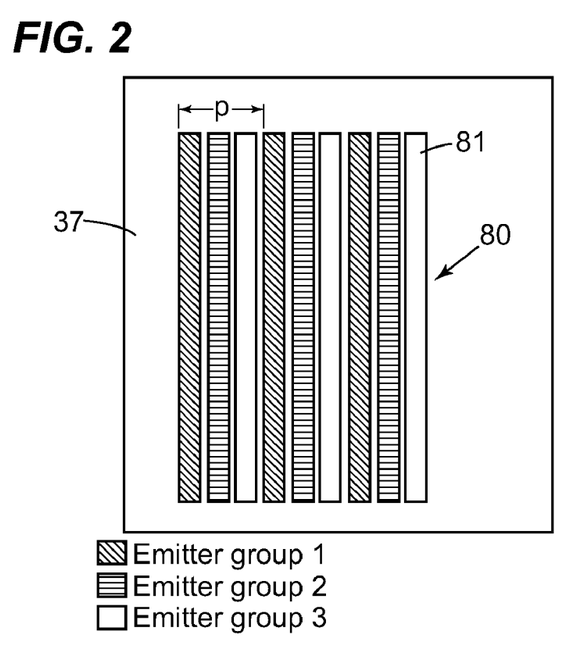
FIG. 2 is top view of a light-emitting diode (LED) array on an emitter module made using elongated die.

FIG. 2 illustrates an exemplary case when LED array 80 is made using elongated die. In FIG. 2, line grating 90 (not shown here, but shown in FIG. 3) has a grating period p. Each LED 81 has a width less than ⅓ of the grating period p, and each LED 81 is lined up adjacent to each other with a center-to-center spacing of p/3. In this configuration, the line pattern projected when one LED 81 is emitting has a spatial or phase-shift of approximately ⅓ of the line period or 120° relative to the line pattern projected when the adjacent LED is emitting. Exemplary emitting area dimensions for each LED 81 used with an 8 cycle/mm grating period p may be 35 μm×500 μm.

Alternatively, an effective phase-shift of 120° can be achieved with configurations in which the LED 81 spacing is other than ⅓ of the grating period. For example, with an LED 81 spacing of ⅔ of the grating period, the light pattern projected when one LED 81 is emitting may have a phase-shift of 240° relative to the line pattern projected when the adjacent LED is emitting. In this configuration, each LED 81 has width less than ⅔ of the grating period p, and each LED 81 is lined up adjacent to each other with a center-to-center spacing of 2p/3. Because multiple lines are projected each having a 0 to 360° phase range, the 240° phase-shift is equivalent to a 120° phase-shift. To generalize, by positioning LEDs 81 with a center-to-center spacing of approximately p/3 of the grating period where p is an integer that is not a multiple of 3, the light pattern projected when one LED 81 is emitting may have an effective phase-shift of approximately 120° relative to the line pattern projected when the adjacent LED is emitting.

Referring back to FIG. 2, multiple LEDs are spaced apart by one grating period to create three separate emitter groups. For clarification only, the LEDs that comprise each of the three emitter groups in FIG. 2 are indicated with a different pattern. LED array 80 comprises individual LEDs 81 of the same color. However, the color of LEDs comprising one emitter group can differ from the color of the LEDs comprising other emitter groups.

A plurality of light emitters comprising each emitter group are spaced apart along the axis perpendicular to the lines on the line grating by a distance approximately equal to an integer number of periods of the line grating. As a result, when the plurality of light emitters comprising one emitter group are simultaneously emitting light, the structured-light patterns produced by each of the multiple emitters sum together. This forms a brighter line pattern than would be generated by a single emitter element. Increasing the emitter width can increase brightness, but the line grating period must increase proportionally causing proportionally higher sensitivity to image noise. By using a plurality of narrow emitters as described, the pattern brightness can be increased without increasing the line grating period.

Emitter drive 32 of FIG. 1 comprises a brightness or fringe contrast determining function 39 to determine whether one emitter or multiple emitters should be enabled for each emitter group. Because the light from the emitters is not collimated, the projected fringe sets expand as distance from the line grating increases. When multiple emitters of an emitter group are simultaneously emitting, the individual fringe sets are offset by a constant distance (one grating period p as shown in the exemplary cases of FIGS. 2 and 3) rather than a constant phase, so their phases become more aligned as they expand. This results in progressively higher contrast as distance from the grating increases. Thus, when measuring a surface where more intensity is needed to achieve low image noise, multiple emitters from the same fringe set can be simultaneously turned on to provide more brightness at high contrast. However, at close distances, the sinusoidal intensities are not phase aligned and fringe set contrast decreases. Also, less intensity is needed at close distances; so when viewing a closer surface, one emitter can be turned on to achieve adequate intensity and high contrast.

Depending on the evaluation from brightness determining function 39, one light emitter or multiple light emitters in each emitter group are enabled for each fringe set. In an embodiment of the present invention, drive conductor 35 comprises one or more drive wires (not shown) per LED. Brightness determining function 39 selectively transmits current through specific drive wires of drive conductor 35 to light an appropriate number of LEDs per fringe set.

Alternatively, brightness determining function 39 can be located separately from emitter drive 32 and may comprise, for example, an analog detection circuit or video processor. With that assembly, one drive wire of drive conductor 35 connects emitter drive 32 to emitter module 37, and one or more control wires (not shown) controlled by brightness determining function 39 are also connected to emitter module 37. A circuit (not shown) included on emitter module 37 can selectively connect one or multiple LEDs to the drive wire in response to signals on the control wire(s).

Through the use of multiple emitters per fringe set and brightness determining function 39, LED array 80 offers adequate brightness and contrast during image capture and measurement. LED array 80 also offers consistent, uniform illumination, no speckling, and fast switching between fringe sets. Fast switching allows fringe set images to be captured in sequential frames, which reduces the likelihood of motion between image capture times. For at least these reasons, LED arrays are practical in this configuration. However, any light emitting source(s) offering the qualities mentioned above are sufficient for use in probe system 10. Other such light sources include, but are not limited to, organic LEDs, plasma elements, fiber coupled lasers, and laser arrays.

Figure 4:
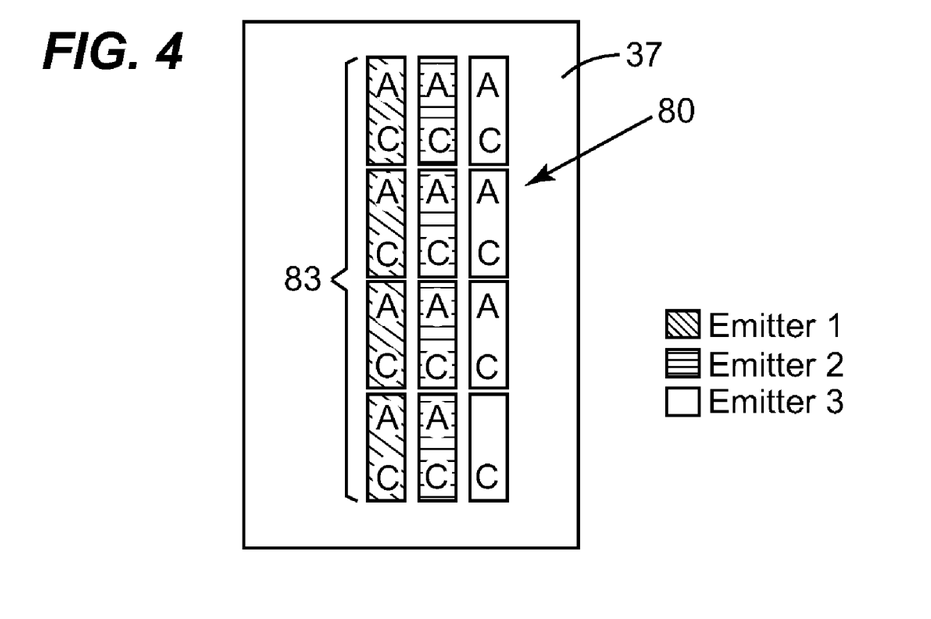
FIG. 4 is a top view of an LED array on an emitter module where each emitter comprises 4 LEDs connected in series.
Figure 5:
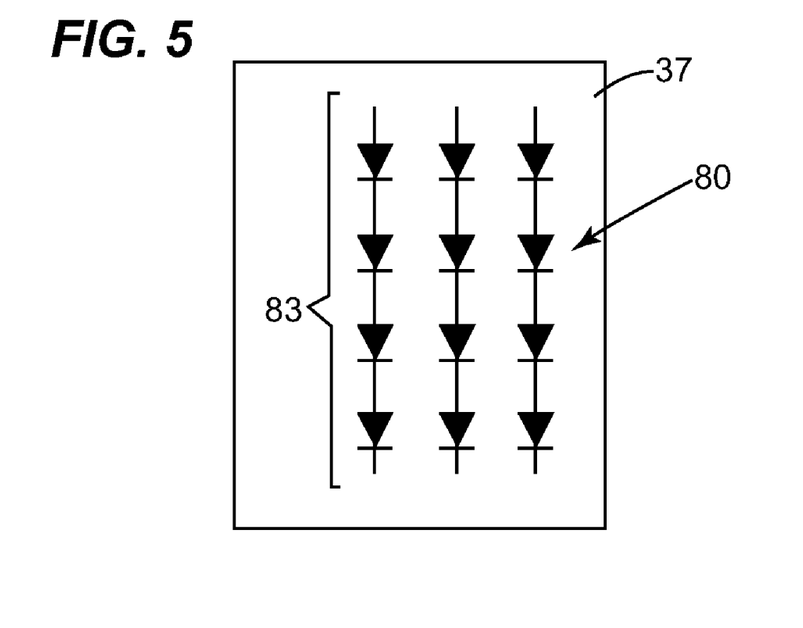
FIG. 5 is a top view of the LED array of FIG. 4 illustrating the series connection.

In another embodiment of the present invention, LED array 80 is made using multiple series LEDs that comprise one emitter of an emitter group. An emitter in this configuration may also be referred to as a string. FIG. 4 illustrates an exemplary case when each emitter or string 83 comprises 4 LEDs connected in series. FIG. 5 illustrates the series connection. Each emitter or string 83 would be offset by approximately p/3 periods, where p is an integer that is not a multiple of 3. Similar to FIG. 2, for clarification only, the plurality of LEDs that comprise one emitter of an emitter group are indicated with a different pattern. Each of the plurality of light emitters may comprise a series string of at least two LEDs. In FIG. 4, three strings are shown comprising four LEDs each, each string comprising its own emitter group. However, as described in relation to FIG. 2, an emitter group may comprise a plurality of emitters or strings as well.

LED output is typically proportional to drive current. But, supplying high currents to distally-located LEDs using small wires is highly inefficient. By using multiple LEDs connected in series to comprise one emitter 83, less current is required to achieve a given combined LED output level. For example, series strings of 4 LEDs as shown in FIG. 4 can achieve the same output as single LEDs using $\frac{1}{4}^{th}$ of the current.

Figure 6:
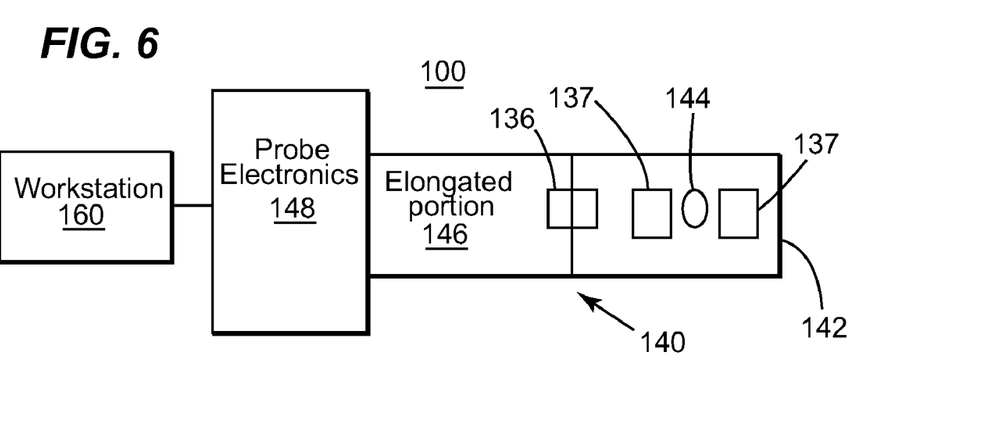
FIG. 6 is a generalized schematic diagram of a probe system in accordance with another embodiment of the present invention.

Referring now to FIG. 6, borescope/endoscope system or probe system 100 is shown generally in accordance with another embodiment of the present invention. Probe system 100 comprises insertion tube 140, probe electronics 148, and workstation 160. Workstation 160 comprises similar elements to those connected to probe electronics 48 described in detail and shown FIG. 1. System 100 as a whole also comprises similar elements and operates in a similar manner as probe system 10 of FIG. 1.

Insertion tube 140 comprises elongated portion 146 and detachable distal tip 142. Detachable distal tip 142 comprises two emitter modules 137, forward viewing tip optics 144, and contacts 136. Contacts 136 provide power to tip 142, electrically couple elongated portion 146 to detachable tip 142, and may be spring loaded. Insertion tube 140 may also comprise at least one intensity modulating area (not shown).

Figure 7:
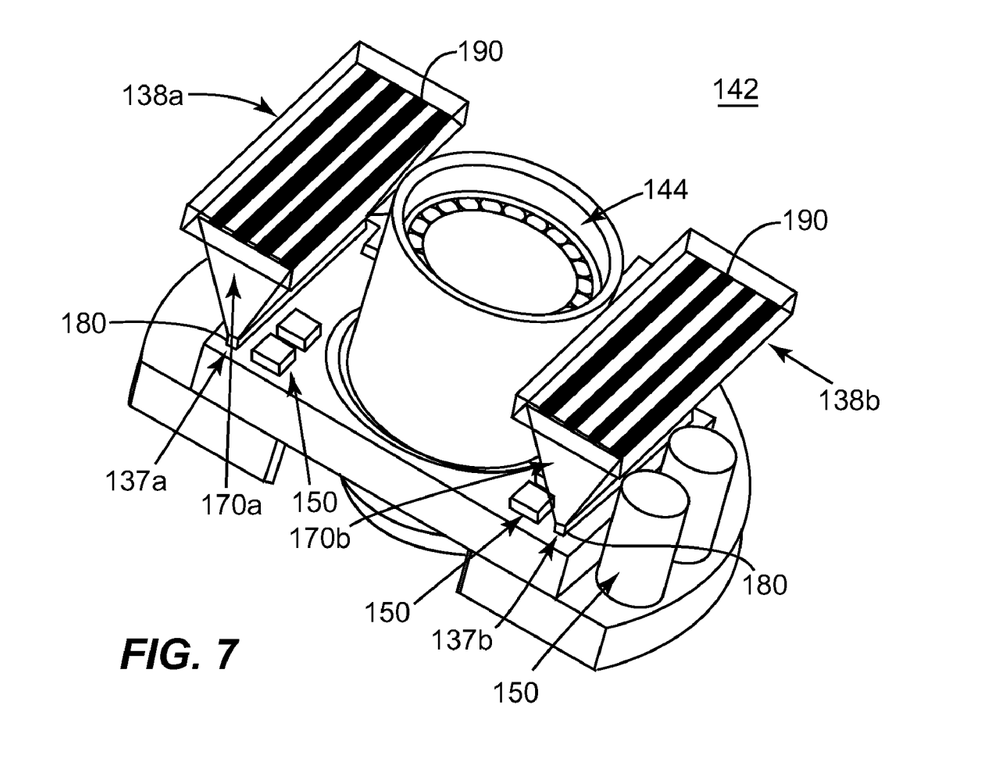
FIG. 7 is a perspective view of an exemplary embodiment of a detachable tip as shown in FIG. 6.

Referring now to FIG. 7, an exemplary embodiment of detachable tip 142 of FIG. 6 is shown. Like FIG. 6, two emitter modules 137 comprising a plurality of light emitters are positioned on each side of forward viewing tip optics 144. The plurality of light emitters positioned on one side of viewing optics 144 comprises first emitter module 137a, and the plurality of light emitters positioned on the other side of viewing optics 144 comprises second emitter module 137b. In addition, intensity modulating element 138 comprises two intensity modulating areas 138a and 138b, one intensity modulating area positioned on each side of forward viewing tip optics 144. Light from first emitter module 137a is passed via path 170a through intensity modulating area 138a, which forms a first projection set, and light from second emitting module 137b is passed via path 170b through intensity modulating area 138b, which forms a second projection set. Intensity modulating element 138 comprises line grating 190, which alters the distribution of light and creates a structured-light pattern on the surface compatible with phase-shift analysis.

An imager (not shown) obtains a first image set and a second image set. The first image set comprises at least one image of a projection onto the surface of at least one of the plurality of fringe sets of the first projection set, and the second image set comprises at least one image of a projection onto the surface of at least one of the plurality of fringe sets of the second projection set.

First emitter module 137a associated with first intensity modulating area 138a is positioned on one side of viewing optics 144, and second emitter module 137b associated with second intensity modulating area 138b is positioned on the other side of viewing optics 144 such that the at least one structured-light pattern reflected from the surface passes through viewing optics 144 to reach the imager.

The two emitter modules 137 each comprise an elongated LED array 180, which intern comprises at least three LEDs or light emitters. Alternatively, the two emitter modules 137 may each comprise a plurality of light emitters, each of the plurality of light emitters comprising a series string of at least two LEDs. A light passing element (not shown), which delivers light from an inspection light source 23 (FIG. 1) to the surface may also be included in tip 142. Optional circuitry 150 located on tip 142 may control sequencing of the LEDs, select between single and multiple LEDs, sense temperature, and store/retrieve calibration data. The optional circuitry 150 could be managed by the CPU 56 or microcontroller 30 shown in FIG. 1.

In system 100, the first projection set comprises a plurality of fringe sets and the second projection set comprises a plurality of fringe sets. The plurality of light emitters are positioned such that the structured-light pattern of one fringe set of the first projection set projected from one emitter group of the first emitter module exhibits a phase-shift relative to the structured-light patterns of the other fringe sets of the first projection set projected from the other emitter groups of the first emitter module. Similarly, the structured-light pattern of one fringe set of the second projection set projected from one emitter group of the second emitter module exhibits a phase-shift relative to the structured-light patterns of the other fringe sets of the second projection set projected from the other emitter groups of the second emitter module.

The plurality of light emitters are positioned such that the structured-light pattern of one fringe set of the first projection set exhibits a spatial or phase-shift relative to the structured-light patterns of other fringe sets of the first projection set. Similarly, the structured-light pattern of one fringe set of the second projection set exhibits a spatial or phase-shift relative to the structured-light patterns of other fringe sets of the second projection set.

In an embodiment of the present invention, the first emitter module comprises three emitter groups and the second emitter module comprises three emitter groups. Therefore, three fringe sets comprising the first projection set are produced from one side of viewing optics 144 and three fringe sets comprising the second projection set are produced from the other side of viewing optics 144. Therefore, system 100 can project a total of six fringe sets, three fringe sets from each side of the FOV. In order to improve brightness and contrast, emitter modules 137a and 137b may include more than three LEDs along with a brightness determining function as described in detail above. Furthermore, the plurality of light emitters of emitter modules 137a and 137b may each include a series string of at least two LEDs.

The accuracy of a system employing structured-light projection and phase-shift analysis is largely determined by its baseline spacing. In the case of a typical system wherein the absolute phase of a fringe set combined with its position in the FOV are used to determine absolute object distance, the baseline spacing is the distance between the projection origin and the camera field of view origin. In this embodiment, wherein the difference between the absolute phases of the two separate fringe sets is used to determine absolute object distance, the baseline spacing is the distance between emitter modules 137a and 137b. Thus, accuracy is improved when the distance between the two emitter modules 137a and 137b is larger than the distance between the viewing optics 144 and a single emitter module 137. As mechanical constraints in small-diameter probes make it difficult to substantially offset the viewing optics 144 from the center of the insertion tube 140, the described embodiment employing two emitter modules 137a and 137b can generally achieve a larger baseline spacing than could be achieved with a single emitter module 137 in a forward-viewing system.

In addition, variability in the positioning of the detachable tip 142 on the insertion tube causes the projections originating from the tip to shift relative to the FOV. If object distance is computed using absolute phase combined with position in the FOV, this shift causes error in the computed object distance. In this embodiment, such error is eliminated because the absolute phase difference is not affected by positioning of the tip on the insertion tube. In an alternative approach, the two LED arrays may also be located on one side of the viewing optics with a large grating where the first projection set is offset from the viewing optics by slightly more than the second projection set.

In some applications, it is desirable to obtain a view in a direction perpendicular to the probe axis, referred to as a side view. To obtain such a view, detachable tip 142 may be replaced with a detachable side-viewing tip 242 (FIGS. 8 and 9) comprising elements such as a side-view prism 210 through which the plurality of fringe sets reflected from the surface pass through viewing optics 244 to reach the imager (not shown).

Figure 8A:
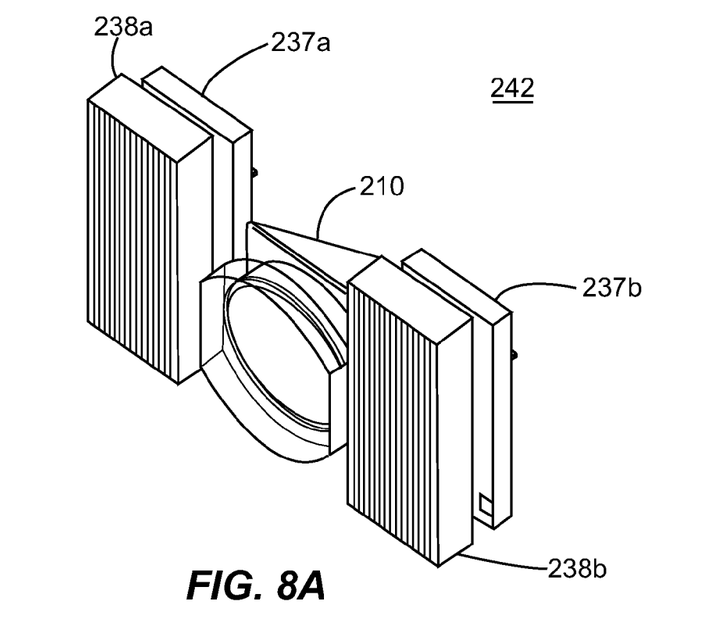
FIG. 8A is a perspective view of an exemplary embodiment of a detachable side-viewing tip.
Figure 8B:
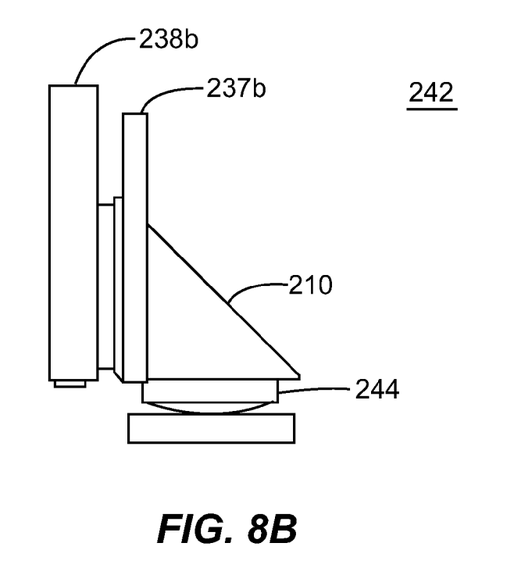
FIG. 8B is a side view of the detachable side-viewing tip of FIG. 8A.

FIGS. 8A and 8B show an exemplary embodiment of side-viewing tip 242. Seen in FIG. 8A, the plurality of light emitters are positioned to emit light in a direction substantially perpendicular to the axis of the probe. In this case, emitter modules 237a and 237b are disposed on each side of side-view prism 210 and rotated 90° (relative to the position of the plurality of emitter modules shown in FIG. 7) to direct the plurality of fringe sets to the side. Specifically, emitter module 237a is disposed on one side of side-view prism 210, and emitter module 237b is disposed on the other side of side-view prism 210. Furthermore, intensity-modulating area 238a is disposed on one side of side-view prism 210, and intensity-modulating area 237b is disposed on the other side of side-view prism 210 such that light emitted from emitter module 237a passes through intensity modulating area 238a and light emitted from emitter module 237b passes through intensity-modulating area 238b. FIG. 8B shows a side view of side-viewing tip 242.

Figure 9A:
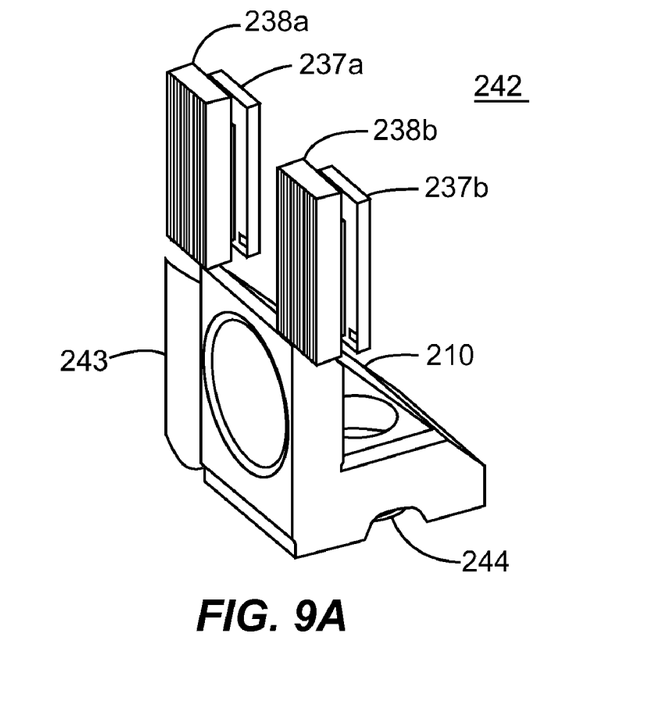
FIG. 9A is a perspective view of another exemplary embodiment of a detachable side-viewing tip.
Figure 9B:
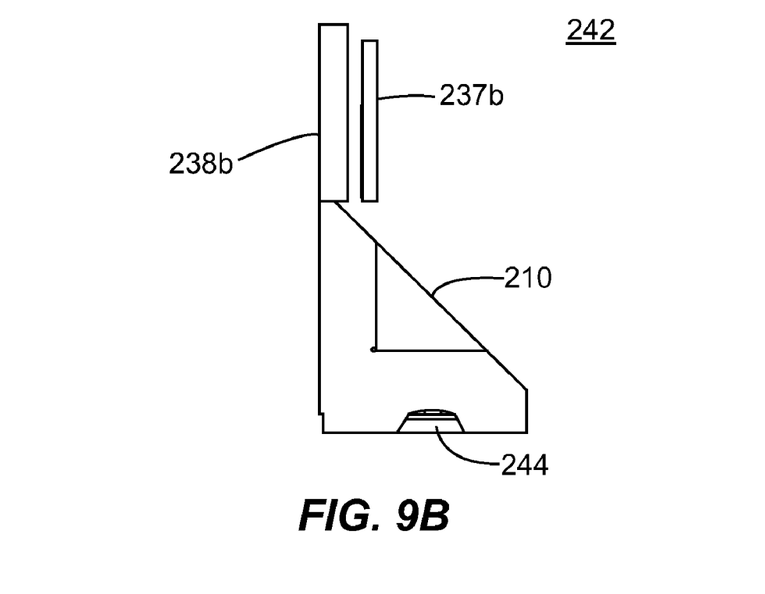
FIG. 9B is a side view of the detachable side-viewing tip of FIG. 9A.

In an alternative exemplary embodiment, shown in FIGS. 9A and 9B, emitter modules 237a and 237b and intensity-modulating areas 238a and 238b are disposed above the top edge of side-view prism 210 and oriented perpendicularly to the top edge of prism 210. Emitter modules 237a and 237b are positioned to emit light in a direction substantially perpendicular to the axis of the probe. FIG. 9A shows light passing element 243 located on one side of side-view prism 210 to direct the light from the inspection light source (not shown) to the side. FIG. 9B shows a side view of side-view tip 242 in accordance with this exemplary embodiment.

Alternatively, the emitter modules and intensity-modulating areas may be oriented parallel to the top edge of the prism. With that orientation, one emitter module and intensity-modulating area may be disposed just above the top edge of the side-view prism while the other emitter module and intensity-modulating area may be spaced more distally, further above the prism away from the imager. This way, the detachable side-viewing tip can be made longer to achieve a larger spacing between the emitter modules without increasing the diameter of the insertion tube.

The construction and arrangement of the fringe projection system and method, as described herein and shown in the appended figures, is illustrative only. Although only a few embodiments of the invention have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, orientations, etc.) without materially departing from the novel teachings and advantages of the subject matter recited in the appended claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the embodiments of the invention as expressed in the appended claims. Therefore, the technical scope of the present invention encompasses not only those embodiments described above, but also those that fall within the scope of the appended claims.

The construction and arrangement of the imager system and method, as described herein and shown in the appended figures, is illustrative only. Those skilled in the art will recognize that the imager system can include a conventional bore scope relay system, imaging bundle, or other means of removing the camera without deviating from the function of the described method. Although only a few embodiments of the invention have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, orientations, etc.) without materially departing from the novel teachings and advantages of the subject matter recited in the appended claims. Accordingly, all such modifications are intended to be included within the scope of the present invention as defined in the appended claims.

What is claimed is:

1. A probe comprising:
    an insertion tube;
    a plurality of light emitters disposed on the distal end of the insertion tube;
    at least one intensity modulating element through which light from the plurality of light emitters is passed to project a plurality of fringe sets onto a surface, each of the plurality of fringe sets comprising a structured-light pattern projected when one emitter group of at least one of the plurality of light emitters is emitting;
    an imager for obtaining at least one image of the surface;
    a processing unit that is configured to perform phase-shift analysis on the at least one image;
    an inspection light delivery system which delivers light from an inspection light source to the surface;
    wherein the inspection light delivery system outputs light from the distal end of the insertion tube during inspection mode;
    wherein the intensity of light output from the inspection light delivery system is automatically decreased during measurement mode; and
    wherein the probe operates in measurement mode when at least one of the plurality of fringe sets is projected onto the surface.

2. The probe of claim 1, wherein the structured-light pattern comprises parallel light and dark lines and wherein the parallel light and dark lines comprise sinusoidal intensity profiles.

3. The probe of claim 1, further comprising:
    viewing optics which guide and focus light from the surface onto the imager.

4. The probe of claim 1, wherein the probe operates in measurement mode when at least one of the plurality of fringe sets is projected onto the surface.

5. The probe of claim 1, further comprising:
    a shutter mechanism which allows light output from the inspection light delivery system during inspection mode and inhibits light output from the inspection light delivery system during measurement mode.

6. The probe of claim, further comprising:
    a side-view prism through which the plurality of fringe sets reflected from the surface pass to reach the imager;
    wherein the plurality of light emitters are positioned to emit light in a direction substantially perpendicular to the axis of the probe.

7. The probe of claim 1, wherein the plurality of light emitters are positioned such that the structured-light pattern of one fringe set exhibits a phase-shift relative to the structured-light patterns of other fringe sets.

8. The probe of claim 1, further comprising:
    a brightness determining function to determine whether one light emitter or multiple light emitters in each emitter group should be enabled for each fringe set.

9. The probe of claim 1, wherein the intensity modulating element comprises a line grating having a grating period and wherein the plurality of light emitters are spaced apart along the axis perpendicular to the lines on the line grating.

10. The probe of claim 1, wherein each of the plurality of light emitters comprises a series string of at least two light emitting diodes.

11. The probe of claim 1, further comprising:
a detachable distal tip comprising the at least one intensity-modulating element, wherein the plurality of light emitters are fixedly attached to the insertion tube.

12. The probe of claim 1, further comprising:
a detachable distal tip comprising the plurality of light emitters, the at least one intensity modulating element, and contacts, the contacts electrically coupling an elongated portion of the insertion tube to the detachable distal tip.

13. The probe of claim 12, wherein the contacts are spring loaded.

14. A probe comprising:
an insertion tube;
a plurality of light emitters disposed on the distal end of the insertion tube;
at least one intensity modulating element through which light from the plurality of light emitters is passed to project a plurality of fringe sets onto a surface, each of the plurality of fringe sets comprising a structured-light pattern projected when one emitter group of at least one of the plurality of light emitters is emitting;
an imager for obtaining at least one image of the surface;
a processing unit that is configured to perform phase-shift analysis on the at least one image;
viewing optics which guide and focus light from the surface onto the imager;
wherein the plurality of light emitters are positioned on each side of the viewing optics, the plurality of light emitters positioned on one side of the viewing optics comprising a first emitter module and the plurality of light emitters positioned on the other side of the viewing optics comprising a second emitter module; and
the at least one intensity modulating element comprises two intensity modulating areas, a first intensity modulating area positioned on one side of the viewing optics and a second intensity modulating area positioned on the other side of the viewing optics such that:
light from the first emitter module passes through first intensity modulating area forming a first projection set and light from the second emitter module passes through the second intensity modulating area forming a second projection set, the first projection set comprising a plurality of fringe sets and the second projection set comprising a plurality of fringe sets.

15. The probe of claim 14, wherein:
the plurality of light emitters are positioned such that:
the structured-light pattern of one fringe set of the first projection set exhibits a phase-shift relative to the structured-light patterns of other fringe sets of the first projection set; and
the structured-light pattern of one fringe set of the second projection set exhibits a phase-shift relative to the structured-light patterns of other fringe sets of the second projection set;
wherein the at least one image comprises a first image set and a second image set, the first image set comprising at least one image of a projection onto the surface of at least one of the plurality of fringe sets of the first projection set, and the second image set comprising at least one image of a projection onto the surface of at least one of the plurality of fringe sets of the second projection set.

16. The probe of claim 14, wherein the first emitter module comprises three emitter groups and the second emitter module comprises three emitter groups.

17. The probe of claim 14, wherein the plurality of light emitters comprise light emitting diodes.

18. A method for projecting a plurality of fringe sets suitable for phase-shift analysis on a surface using a probe, comprising:
disposing viewing optics on the distal end of an insertion tube;
disposing a plurality of light emitters on each side of the viewing optics, the plurality of light emitters positioned on one side of the viewing optics comprising a first emitter module and the plurality of light emitters positioned on the other side of the viewing optics comprising a second emitter module, the first emitter module comprising a plurality of emitter groups comprising at least one of the plurality of light emitters of the first emitter module and the second emitter module comprising a plurality of emitter groups comprising at least one of the plurality of light emitters of the second emitter module;
disposing an intensity modulating area on each side of the viewing optics, a first intensity modulating area positioned on one side of the viewing optics and a second intensity modulating area positioned on the other side of the viewing optics;
passing light from the first emitter module through the first intensity modulating area to form a first projection set and passing light from the second emitter module through the second intensity modulating area forming a second projection set, the first projection set comprising a plurality of fringe sets and the second projection set comprising a plurality of fringe sets, each of the plurality of fringe sets comprising a structured-light pattern projected onto the surface when one emitter group of at least one of the plurality of light emitters is emitting;
wherein the plurality of light emitters are positioned such that:
the structured-light pattern of one fringe set of the first projection set projected from one emitter group of the first emitter module exhibits a phase-shift relative to the structured-light patterns of the other fringe sets of the first projection set projected from the other emitter groups of the first emitter module; and
the structured-light pattern of one fringe set of the second projection set projected from one emitter group of the second emitter module exhibits a phase-shift relative to the structured-light patterns of the other fringe sets of the second projection set projected from the other emitter groups of the second emitter module.

19. The method of claim 18, further comprising:
obtaining a first image set and a second image set, the first image set comprising at least one image of a projection onto the surface of at least one of the plurality of fringe sets of the first projection set, and the second image set comprising at least one image of a projection onto the surface of at least one of the plurality of fringe sets of the second projection set.

* * * * *

UNITED STATES PATENT AND TRADEMARK OFFICE
CERTIFICATE OF CORRECTION

| | |
|---|---|
| PATENT NO. | : 7,821,649 B2 |
| APPLICATION NO. | : 12/042821 |
| DATED | : October 26, 2010 |
| INVENTOR(S) | : Bendall et al. |

It is certified that error appears in the above-identified patent and that said Letters Patent is hereby corrected as shown below:

In Column 12, Line 46, in Claim 6, delete "claim," and insert -- claim 1, --, therefor.

Signed and Sealed this
Eighth Day of March, 2011

David J. Kappos
*Director of the United States Patent and Trademark Office*